US012387704B2

(12) United States Patent
Klein

(10) Patent No.: US 12,387,704 B2
(45) Date of Patent: Aug. 12, 2025

(54) SYSTEM, APPARATUS, AND METHOD FOR ABSORBING SOUND

(71) Applicant: Starfire Lighting, Inc., Woodridge, NJ (US)

(72) Inventor: Steven Klein, Wayne, NJ (US)

(73) Assignee: Starfire Lighting, Inc., Woodridge, NJ (US)

( * ) Notice: Subject to any disclaimer, the term of this patent is extended or adjusted under 35 U.S.C. 154(b) by 0 days.

(21) Appl. No.: 18/971,814

(22) Filed: Dec. 6, 2024

(65) Prior Publication Data

US 2025/0201224 A1 Jun. 19, 2025

Related U.S. Application Data

(60) Provisional application No. 63/610,893, filed on Dec. 15, 2023.

(51) Int. Cl.

| | |
|---|---|
| ***G10K 11/16*** | (2006.01) |
| ***F21V 3/06*** | (2018.01) |
| ***F21V 17/12*** | (2006.01) |
| ***F21V 19/00*** | (2006.01) |
| ***F21V 23/06*** | (2006.01) |
| ***F21V 29/70*** | (2015.01) |

(Continued)

(52) U.S. Cl.

CPC ................ *G10K 11/16* (2013.01); *F21V 3/06* (2018.02); *F21V 17/12* (2013.01); *F21V 19/0055* (2013.01); *F21V 23/06* (2013.01); *F21V 29/70* (2015.01); *F21V 29/89* (2015.01); *F21Y 2115/10* (2016.08)

(58) Field of Classification Search

CPC . G10K 11/16; F21V 3/06; F21V 17/12; F21V 19/0055; F21V 23/06; F21V 29/70; F21V 29/89

See application file for complete search history.

(56) References Cited

U.S. PATENT DOCUMENTS 10,663,157 B2 5/2020 Nicolai
2013/0201690 A1* 8/2013 Vissenberg ............... F21V 9/30 362/296.07

(Continued)

FOREIGN PATENT DOCUMENTS

DE 102012110575 A1 * 5/2014 .............. F21S 2/005
KR 101845916 B1 * 4/2018 .............. F21S 8/063
KR 20220009779 A * 1/2022 .......... F21V 33/0056

OTHER PUBLICATIONS

Jang, "Description KR20220009779A", Jan. 25, 2022, Espacenet Patent Translate by EPO, 13 pages. (Year: 2022).*

(Continued)

*Primary Examiner* — Bryon T Gyllstrom
(74) *Attorney, Agent, or Firm* — Keefe IP Law, PLLC

(57) ABSTRACT

A method is disclosed. The method includes providing a lighting assembly including at least one lighting element, attaching at least one attachment assembly to the lighting assembly, forming an empty space between the lighting assembly and a sound absorbing assembly based on attaching the sound absorbing assembly to the at least one attachment assembly, the sound absorbing assembly including at least one sound absorbing member, and illuminating a translucent or transparent layer using the at least one lighting element.

20 Claims, 7 Drawing Sheets

(51) Int. Cl.
*F21V 29/89* (2015.01)
*F21Y 115/10* (2016.01)

(56) References Cited

U.S. PATENT DOCUMENTS

| | | | | |
|---|---|---|---|---|
| 2016/0178146 | A1* | 6/2016 | Oleske | F21V 21/04<br>52/28 |
| 2021/0010669 | A1* | 1/2021 | van Delden | F21V 7/22 |
| 2021/0190278 | A1* | 6/2021 | Bartella | F21S 8/026 |

OTHER PUBLICATIONS

Park, "Description KR101845916B1", Apr. 6, 2018, Espacenet Patent Translate by EPO, 24 pages. (Year: 2018).*

Anstett et al., "Description DE102012110575A1", May 8, 2014, Espacenet Patent Translate by EPO, 8 pages. (Year: 2014).*

* cited by examiner

SYSTEM, APPARATUS, AND METHOD FOR ABSORBING SOUND

CROSS-REFERENCE TO RELATED APPLICATIONS

This application claims priority to U.S. provisional patent application No. 63/610,893 filed Dec. 15, 2023, the entire disclosure of which is incorporated herein by reference.

TECHNICAL FIELD

The present disclosure generally relates to a system, apparatus, and method for controlling sound, and more particularly to a system, apparatus, and method for absorbing in conjunction with the provision of lighting.

BACKGROUND

Backlight lighting fixtures typically include translucent material that is illuminated by lighting fixtures disposed behind the translucent material. The lighting fixtures thereby provide a backlight for the translucent material. In certain applications, translucent material is also transmissive to sound waves.

Conventional backlight lighting fixtures include a backlighting space formed between the lighting fixtures and the translucent material that is illuminated by the lighting fixtures. This configuration usually leads to problems caused by echoing sound. Sound that enters the backlighting space from an occupied space such as an occupied room typically echoes back from the backlighting space to the occupied space.

Conventional techniques exist for absorbing sound in the backlighting space to attempt to prevent echoing of sound back from the backlighting space to an occupied space. However, such conventional techniques typically limit the effectiveness of the sound absorption, create heat transfer challenges for the lighting fixture, and are difficult to install. Accordingly, a need in the art exists for efficiently absorbing sound in lighting fixtures.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to a method. The method includes providing a lighting assembly including at least one lighting element, attaching at least one attachment assembly to the lighting assembly, forming an empty space between the lighting assembly and a sound absorbing assembly based on attaching the sound absorbing assembly to the at least one attachment assembly, the sound absorbing assembly including at least one sound absorbing member, and illuminating a translucent or transparent layer using the at least one lighting element.

In another aspect, the present disclosure is directed to a lighting apparatus for illuminating a translucent or transparent layer. The lighting apparatus includes a lighting assembly including at least one lighting element configured to illuminate the translucent or transparent layer, a sound absorbing assembly including at least one sound absorbing member, and at least one attachment assembly attached to the lighting assembly and the sound absorbing assembly so that an empty space is formed between the lighting assembly and the sound absorbing assembly.

DETAILED DESCRIPTION AND INDUSTRIAL APPLICABILITY

The exemplary disclosed system, apparatus, and method may include one or more lighting apparatuses that may illuminate a translucent layer. For example, the one or more lighting apparatuses may be disposed in a backlighting space that is separated from an occupied space by the translucent layer, for example as described below. The exemplary disclosed system, apparatus, and method may be used in any suitable lighting configurations, for example as described below.

Figure 1:
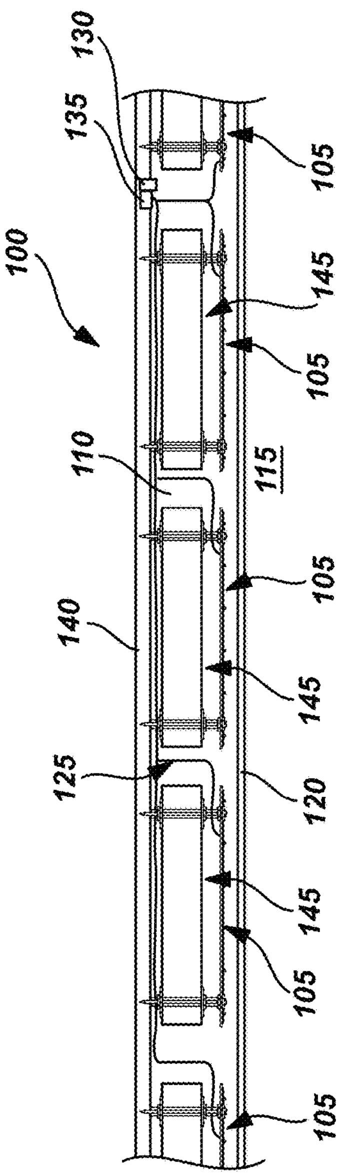
FIG. 1 is a 2-dimensional side view of an exemplary system of the present invention in a surface mount configuration.
Figure 2:
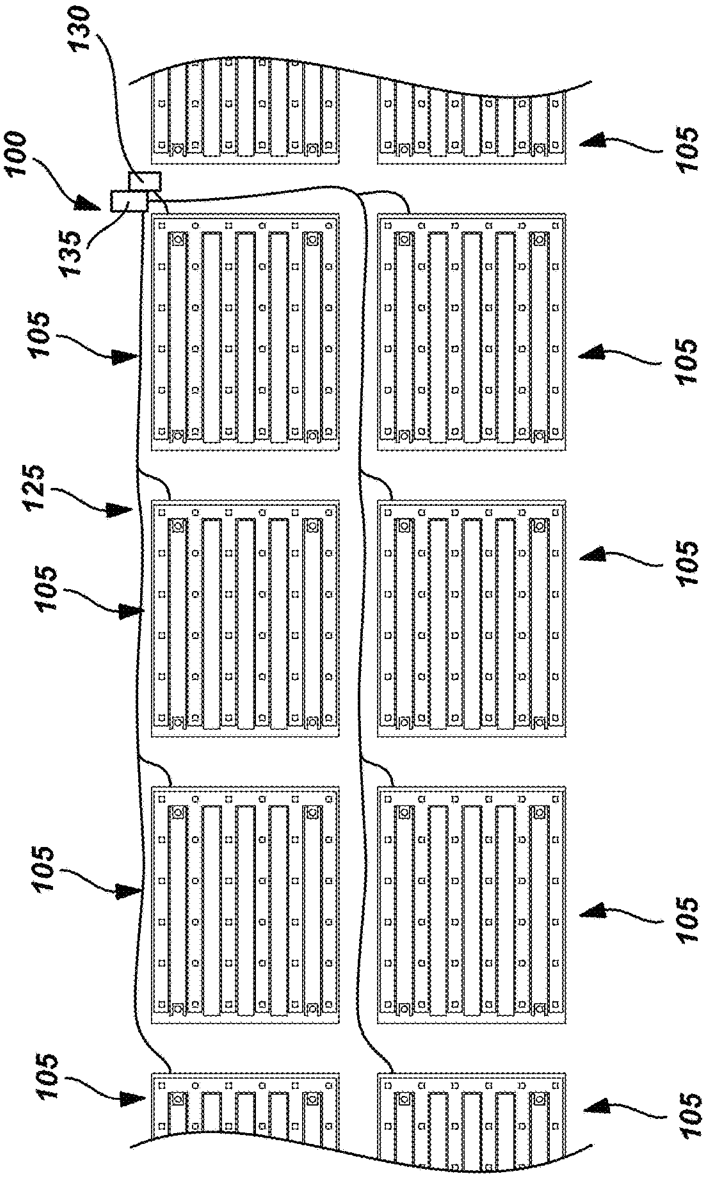
FIG. 2 is a 2-dimensional bottom view of an exemplary system of the present invention.

In at least some exemplary embodiments and as illustrated in FIGS. 1 and 2, a lighting system 100 may include one or more lighting apparatuses 105. Lighting apparatuses 105 may be disposed in a backlighting space 110 that may be separated from an occupied space 115 via a translucent layer 120.

Translucent layer 120 may be a translucent and/or transparent layer through which light can pass and that may be thereby illuminated by lighting apparatus 105. Translucent layer 120 may be a translucent, transparent, and/or sound penetrable layer such as a translucent and sound penetrable film. Translucent layer 120 may be formed from any suitable translucent material such as, for example, vinyl material, polyester material, translucent paper material, polycarbonate material, material (e.g., polyethylene terephthalate), and/or any other suitable material for allowing light to pass through translucent layer 120. Translucent layer 120 may have any suitable thickness such as, for example, up to about 5 mm (e.g., up to about 3 mm). In at least some exemplary embodiments, translucent layer 120 may be a translucent ceiling film. Translucent layer 120 may also be a translucent wall film, a translucent film for a lighted sign, or any other desired surface that may be illuminated. Translucent layer 120 may include micro-perforations to facilitate the passage of sound through translucent layer 120. For example, translucent layer 120 may be a micro-perforated ceiling or wall film (e.g., or a film for any other desired application or orientation to be illuminated).

Translucent layer 120 may separate backlighting space 110 from occupied space 115. For example, occupied space 115 may be a room or other area occupied by users that may be illuminated by lighting apparatus 105 via illumination through translucent layer 120. In at least some exemplary embodiments, occupied space 115 may be a room having a ceiling (e.g., or wall or floor) formed partially (e.g., along with glass or other transparent structural material) or substantially entirely by translucent layer 120. For example as illustrated in FIG. 1, backlighting space 110 may be formed between translucent layer 120 and one or more support structures (e.g., support surfaces) that may support lighting apparatuses 105 (e.g., and translucent layer 120). One or more lighting apparatuses 105 may be disposed within backlighting space 110. Also in at least some exemplary embodiments, lighting system 100 may be used in a lighting fixture that may be independent from a ceiling (e.g., lighting system 100 may be surface-mounted below a hard ceiling or as a pendant mounted below a hard ceiling). For example, lighting apparatus 105 may be enclosed on a frame with translucent film at the bottom, and the whole assembly may then be mounted to a ceiling or suspended below a ceiling.

As illustrated in FIGS. 1 and 2, lighting apparatuses 105 may be connected via one or more electrical connectors 125. Electrical connectors 125 may be any suitable connector for transferring electricity, electrical signals, and/or data to and from lighting apparatuses 105 such as, for example, electrical lines, Electrical connectors 125 may connect lighting apparatuses 105 to a power source 130 and/or a driver 135. In at least some exemplary embodiments, driver 135 may be a remote driver. The exemplary disclosed power source may be any suitable LED driver. Also for example, power source 130 may be any suitable source for electrically powering lighting apparatuses 105 such as, for example, an electrical outlet, an electrical generator, a motor assembly, and/or any other suitable source of power. In at least some exemplary embodiments, lighting apparatuses 105 may be powered via wireless transmission of energy. Driver 135 may be any suitable component (e.g., an electronic driver) for regulating a variable operation and providing power (e.g., from power source 130) to one or more lighting apparatuses 105. For example, driver 135 may rectify voltage (e.g., relatively higher, alternating current voltage provided from power source 130) to relatively lower (e.g., direct voltage) for powering lighting apparatuses 105. One or more (e.g., a plurality of) lighting apparatuses 105 may be driven by driver 135.

Figure 3:
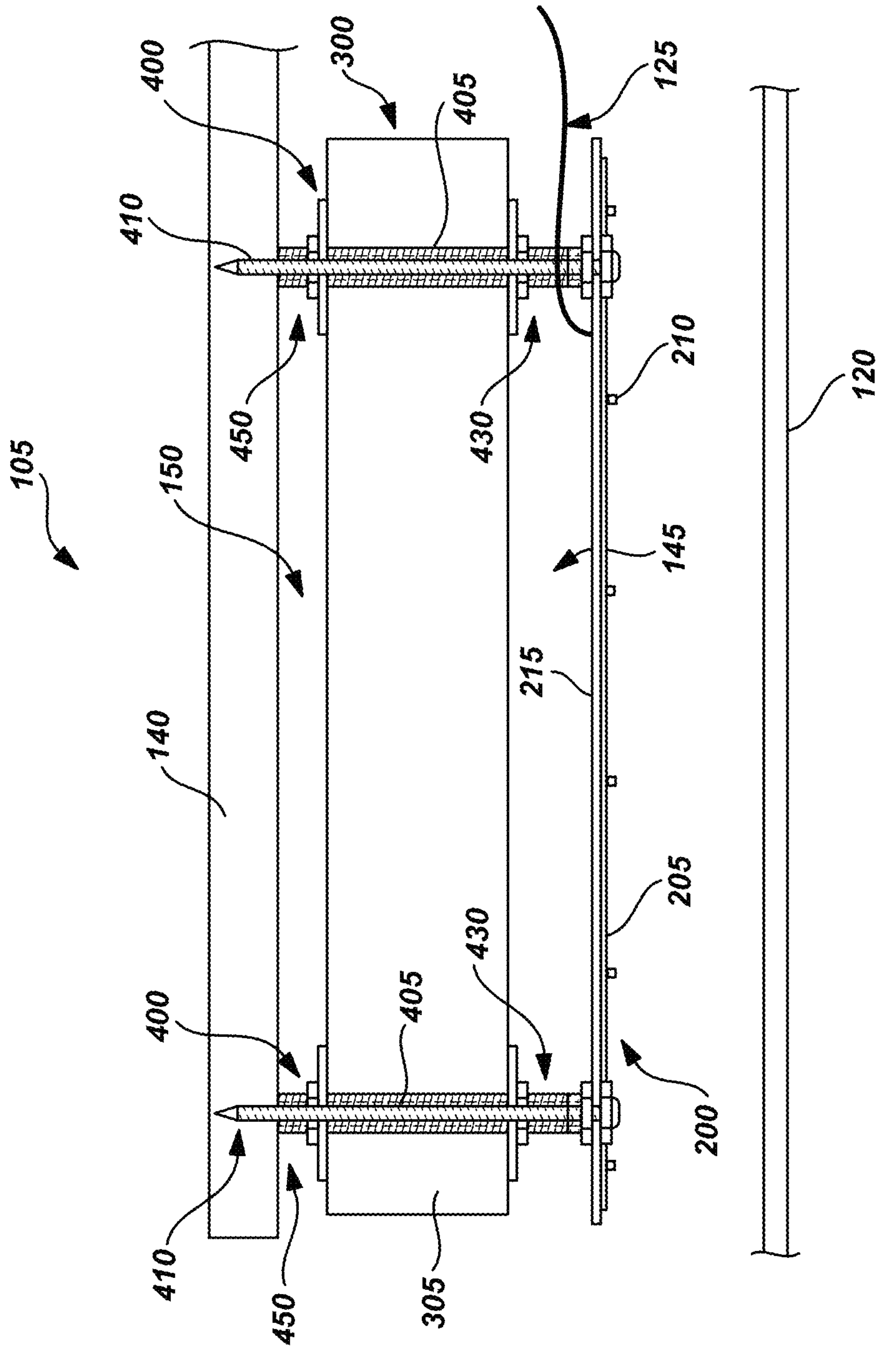
FIG. 3 is a 2-dimensional detailed side view of an exemplary apparatus of the present invention in a surface mount configuration.

FIG. 3 illustrates an exemplary embodiment of lighting apparatus 105, in which a lighting element may be isolated from a sound-absorbing material, with lighting apparatus 105 being attached (e.g., mounted, for example directly mounted) to a support structure disposed above lighting apparatus 105. Lighting apparatus 105 may be attached to a support structure 140. Support structure 140 may include any suitable structural member, structural members, and/or structural assembly or assemblies for supporting lighting apparatus 105. For example, support structure 140 may include one or more structural members and/or a structural assembly of a ceiling, a wall, and/or any other suitable portion of a building, transportation structure (e.g., a bridge), vehicle (e.g., ground, air, or maritime vehicle), or any other desired object or structure.

Lighting apparatus 105 may include a lighting assembly 200, a sound absorbing assembly 300, and one or more attachment assemblies 400. One or more attachment assemblies 400 may attach lighting assembly 200, sound absorbing assembly 300, and support structure 140. For example, one, two, three, four or more (e.g., up to 10 or more) attachment assemblies 400 may attach lighting assembly 200, sound absorbing assembly 300, and support structure 140. Attachment assembly 400 may attach lighting assembly 200 and sound absorbing assembly 300 so that an empty space 145 may be formed between lighting assembly 200 and sound absorbing assembly 300. Attachment assembly 400 may also attach sound absorbing assembly 300 to support structure 140 so that a second empty space 150 may be formed between sound absorbing assembly 300 and support structure 140. A space may alternatively be formed between the exemplary disclosed lighting assembly and the exemplary disclosed support structure for example as described in other exemplary embodiments below. Empty space 145 may provide for the exemplary disclosed attachment of lighting apparatus 105 without using a "surround" or similar structure to hold sound absorbent material. Empty space 145 may thereby provide increased exposed sound absorption surface area to increase noise reduction.

Lighting assembly 200 may include a controller 205, one or more lighting elements 210, and a mounting member 215. Mounting member 215 may support controller 205 and one or more lighting elements 210.

Controller 205 may control an operation of lighting apparatus 105 (e.g., including lighting assembly 200). Controller 205 may include for example a processor (e.g., micro-processing logic control device) or board components. Also for example, controller 205 may include input/output arrangements that allow it to be connected (e.g., via wire such as electrical connectors 125, wireless, Wi-Fi, Bluetooth, or any other suitable communication technique) to other devices and components of lighting system 100. Controller 205 may communicate with any suitable user interface such as a control panel including buttons and switches, a keypad, a touchscreen, voice control interface, and/or any other suitable user interface. For example, controller 205 may communicate with driver 135. Controller 205 may control an operation of lighting apparatus 105 based on input received from a user via controller 205 and/or based on predetermined algorithms or instructions. Controller 205 may include one or more printed circuit boards (PCBs) that may be used to control an operation of lighting apparatus 105. One or more controllers 205 may control an operation of multiple lighting apparatuses 105 (e.g., a given controller 205 of a given lighting apparatus 105 may control or be controlled by other lighting apparatuses 105 of lighting system 100).

Lighting assembly 200 may include one or more (e.g., a plurality of) lighting elements 210. For example, lighting assembly 200 may include many (e.g., a multitude of) lighting elements 210. Lighting element 210 may be any suitable type of lighting element such as, for example, any desired type of light-emitting diode (LED) light. Lighting element 210 may be an LED chip. Lighting element 210 may be any suitable type of lighting element such as, for example, an LED, an OLED, an incandescent lighting element, a fluorescent lighting element, and/or any other suitable type of lighting element.

Mounting member 215 may be any suitable structural member for supporting controller 205 and lighting elements

Figure 4:
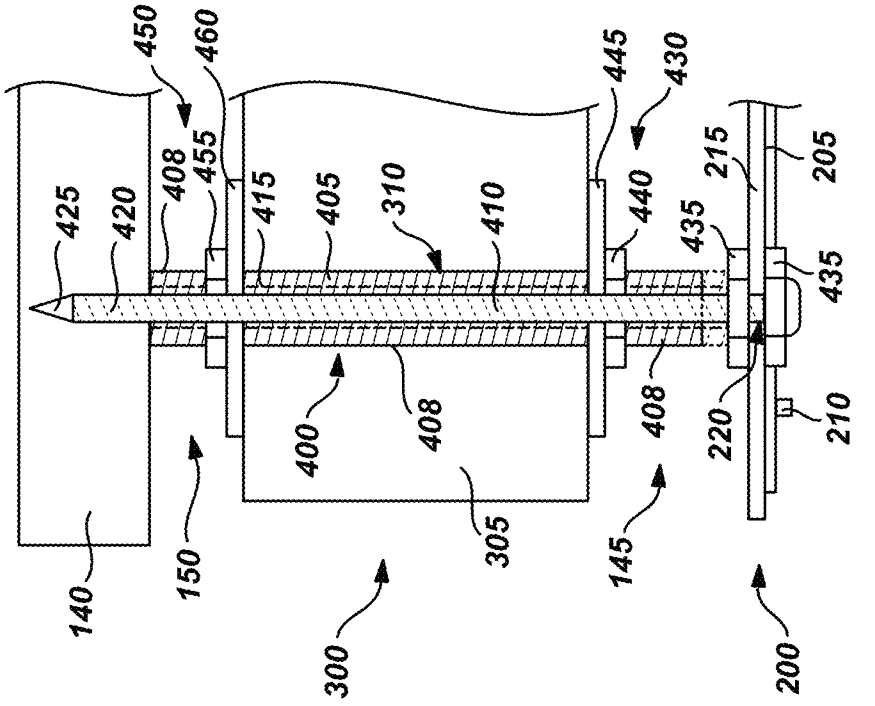
FIG. 4 is a 2-dimensional detailed side view of a mounting point portion of the exemplary apparatus illustrated in FIG. 3.

210. Mounting member 215 may be formed from any suitable thermally conductive material. Mounting member 215 may be a structural plate. Mounting member 215 may be a metal member. Mounting member 215 may be a thermally conductive member formed from any suitable thermally conductive material for supporting controller 205 and lighting elements 210 such as, for example, copper, chrome, brass, nickel, and/or aluminum material. For example, mounting member 215 may transfer heat away from one or more lighting elements 210 As illustrated in FIG. 4, mounting member 215 may include one or more mounting apertures 220 for receiving portions of attachment assembly 400 for example as further described below. Mounting member 215 and/or attachment assembly 400 may act as a thermal transfer device to conduct heat away from lighting elements 210 and controller 205.

Returning to FIG. 3, sound absorbing assembly 300 may include one or more sound absorbing members 305. Sound absorbing member 305 may be formed from any suitable material for absorbing sound such as, for example, foam (e.g., polyurethane foam), fiberglass, fabric or textile material (e.g., cloth, cotton, or felt), silicone, vinyl (e.g., mass loaded vinyl), caulk, polyester, green glue, cork, epoxy, and/or any other suitable sound absorbing material. Sound absorbing member 305 may be in tile form or any other suitable form, shape, or configuration. Sound absorbing member 305 may have any suitable thickness such as, for example, up to about 8" (e.g., or more), between about ½" and about 6", or between about 1" and about 3" (e.g., about 2"). As illustrated in FIG. 4, sound absorbing member 305 may include one or more absorbing apertures 310 for receiving portions of attachment assembly 400 for example as further described below.

As illustrated in FIGS. 3 and 4, attachment assembly 400 may include one or more members 405 and a fastener 410. Member 405 may be hollow or solid (e.g., partially solid and/or substantially entirely solid). Components of attachment assembly 400 may be formed from any suitable structural material for fastening such as, for example, metal, structural plastic, composite material, and/or any other suitable structural material. For example, components of attachment assembly 400 may be formed from steel (e.g., stainless steel), aluminum, titanium, brass, and/or any other suitable structural material. Member 405 may be configured to receive fastener 410. Member 405 may be a tube member. Member 405 may include an elongated aperture 415 (e.g., hole) that may extend along a length of one or more members 405. A surface of solid or hollow member 405 at which aperture 415 may be formed may be threaded or unthreaded. For example, the one or more hollow members 405 may be threaded or unthreaded tubes. Fastener 410 may be any suitable fastener such as a substantially entirely threaded fastener, a partially threaded fastener, or an unthreaded fastener. For example, fastener 410 may be a screw or a bolt that is threaded or unthreaded (e.g., or threaded along a partial length). Fastener 410 may have threads 420 that may or may not be received by corresponding threads of one or more members 405. For example, in at least some exemplary embodiments, fastener 410 may be inserted into member 405 with or without engagement of threading (e.g., with or without being threaded into member 405, or partially threaded into member 405). For example in some exemplary embodiments, member 405 may or may not have threads at a surface forming aperture 415 (e.g., or the surface may be partially threaded). Member 405 may also have member threading 408 disposed at an outer surface of member 405. Fastener 410 may have a tip portion 425 that may be fastened into (e.g., received or screwed into) support structure 140. For example, threads 420 may be disposed at tip portion 425 to facilitate attachment (e.g., screwing) of fastener 410 to support structure 140. Fastener 410 may be attached to support structure 140 for example after attachment assembly 400 is attached to lighting assembly 200 and sound absorbing assembly 300 as described below. In at least some exemplary embodiments, fastener 410 may be attached to support structure 140 before or during attachment of attachment assembly 400 to lighting assembly 200 and/or sound absorbing assembly 300.

Attachment assembly 400 may also include a first positioning assembly 430 (e.g., a lower positioning assembly) having a plurality of attaching nuts 435, a positioning nut 440, and a positioning washer 445. Attaching nuts 435, positioning nut 440, and positioning washer 445 may be any suitable threaded or unthreaded mechanical fasteners formed for example from the exemplary materials for components of attachment assembly 400 disclosed above. Attaching nuts 435 may have threading that may be configured to thread with member threading 408 that may be disposed at the exterior surface of member 405 (e.g., or threads 420 of fastener 410). Attaching nuts 435 may be disposed on both sides of mounting member 215). For example, members 405 may be attached to mounting member 215 at various points. Attaching nuts 435 may be threaded to tighten attaching nuts 435 against both sides of mounting member 215 (e.g., attaching nuts 435 may be tightened against each other and mounting member 215). Mounting member 215 may also be attached to member 405 via any other suitable technique such as, for example, soldering or welding, adhesive, and/or any other suitable fasteners or mechanical technique. Positioning nut 440 may also have threading that may be configured to thread with member threading 408 that may be disposed at the exterior surface of member 405 (e.g., or threads 420 of fastener 410). Positioning nut 440 may be threaded onto member 405 (e.g., or fastener 410) to a desired position such that a desired empty space 145 may be provided between lighting assembly 200 and sound absorbing assembly 300. Positioning washer 445 may be received on member 405 (e.g., or fastener 410) between positioning nut 440 and sound absorbing member 305 (e.g., with sound absorbing member 305 resting on positioning washer 445 and positioning nut 440). In at least some exemplary embodiments, positioning nut 440 may be formed as a hollow collar that slips over the exemplary disclosed member. Its length may establish an Empty Space distance of empty space 145. For example, empty space 145 may be provided at any suitable distance such as, for example, between about 1" and about 12" or more, between about 2" and about 10", between about 3" and about 8", or any other desired distance. In at least some exemplary embodiments, empty spaces 145 (e.g., and/or other exemplary disclosed empty spaces for example as described herein) of adjacent lighting apparatuses 105 may be aligned (e.g., horizontally aligned or vertically aligned) for example as illustrated in FIG. 1.

Returning to FIGS. 3 and 4, member 405 may be configured to have a similar diameter as a diameter of absorbing aperture 310 of sound absorbing member 305. For example, member 405 may be relatively tightly or snugly received in absorbing aperture 310. Sound absorbing member 305 may be placed on member 405 and pressed down until it rests on positioning washer 445 and positioning nut 440 (e.g., during an installation of lighting apparatus 105).

Attachment assembly 400 may also include a second positioning assembly 450 (e.g., an upper positioning assembly) having a holding nut 455 and a holding washer 460. Holding nut 455 and holding washer 460 may be any suitable threaded or unthreaded mechanical fasteners formed for example from the exemplary materials disclosed above. Holding washer 460 may be placed on (e.g., received by) member 405 (e.g., or fastener 410) so that holding washer 460 rests on sound absorbing member 305. Holding nut 455 may have threading that may be configured to thread with member threading 408 that may be disposed at the exterior surface of member 405 (e.g., or threads 420 of fastener 410). Holding nut 455 may be threaded onto member 405 (e.g., or fastener 410) and suitably tightened against holding washer 460 to press holding washer 460 against sound absorbing member 305 to hold sound absorbing member 305 in place (e.g., firmly in place). Holding nut 455 may be threaded onto member 405 (e.g., or fastener 410) to a desired position such that a desired second empty space 150 is provided between sound absorbing assembly 300 and support structure 140. Second empty space 150 may be provided at any suitable distance such as, for example, between about ½" and about 12" or more, between about 2" and about 10", between about 3" and about 8", or any other desired distance.

In at least some exemplary embodiments, attachment assembly 400 may include a single member 405 that extends from support structure 140 to lighting assembly 200. In at least some exemplary embodiments, attachment assembly 400 may include a plurality of members 405. For example, attachment assembly 400 may include a first member 405 that extends from lighting assembly 200 to sound absorbing assembly 300 (e.g., from upper attaching nut 435 to positioning nut 440), a second member 405 that extends through a thickness of sound absorbing member 305, and a third member 405 that extends from sound absorbing assembly 300 to support structure 140 (e.g., from holding nut 455 to support structure 140).

In at least some exemplary embodiments, lighting apparatus 105 may be installed by first attaching lighting assembly 200 to attachment assembly 400 as described above, then attaching sound absorbing assembly 300 to attachment assembly 400 as described above, and then receiving fastener 410 through member 405. For example after attachment assembly 400 is attached to lighting assembly 200 and sound absorbing assembly 300, fastener 410 may be attached to support structure 140 by inserting fastener 410 through member 405 (e.g., that may already be attached to lighting assembly 200 and sound absorbing assembly 300 via first positioning assembly 430 and second positioning assembly 450, respectively) from below and then fastening (e.g., screwing and tightening) tip portion 425 of fastener 410 to support structure 140. For example, fastener 410 may be inserted into aperture 415 of member 405 with or without being threaded (e.g., fastener 410 may be inserted or slipped directly into aperture 415 and/or threadably inserted into aperture 415 along some or substantially an entire length of aperture 415). Based on the exemplary disclosed configuration of lighting apparatus 105 described above, tightening forces that tighten fastener 410 to support structure 140 when fastener 410 is received in one or more members 405 may be transferred via member 405 (e.g., only exerted along a longitude of member 405 and/or fastener 410) and not by other components of lighting apparatus 105. Accordingly, lighting apparatus 105 may be attached to support structure 140 without attachment forces affecting lighting assembly 200 and sound absorbing assembly 300.

Lighting apparatus 105 may support sound absorbing assembly 300 without using a surround or similar attachment structure. For example based on attachment assembly 400 providing empty space 145 and/or second empty space 150, an amount of exposed surface area of one or more sound absorbing members 305 may be increased based on the exemplary disclosed support configuration of attachment assembly 400. As the exposed surface area may be increased (e.g., based on empty space 145 and/or second empty space 150), a noise reduction capacity of lighting apparatus 105 may be increased. For example, substantially an entire surface area of one or more sound absorbing members 305 (e.g., except for areas covered by positioning washers 445 and holding washers 460) may be exposed and may contribute to noise reduction performance of lighting apparatus 105.

Figure 5:
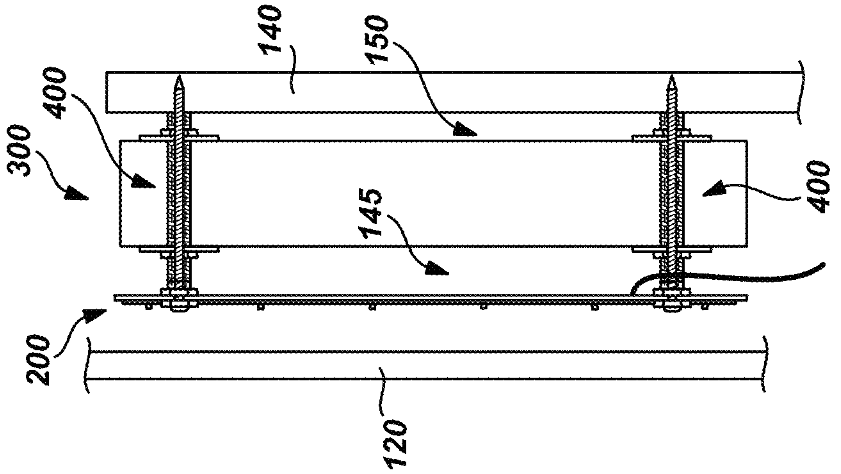
FIG. 5 is a 2-dimensional side view of another exemplary embodiment of an exemplary apparatus of the present invention.

Lighting apparatus 105 may be configured, disposed, and/or oriented in any desired manner relative to backlighting space 110 and occupied space 115. For example, lighting apparatus 105 may be disposed above translucent layer 120 and occupied space 115 as illustrated in FIGS. 1 and 3. Also for example as illustrated in FIG. 5, lighting apparatus 105 may be disposed to a side of translucent layer 120 and occupied space 115. For example, lighting apparatus 105 may act as an illuminated wall panel. Further for example, lighting apparatus 105 may be disposed underneath translucent layer 120 and occupied space 115 (e.g., when translucent layer 120 may be attached to glass or other transparent structural material).

Figure 6:
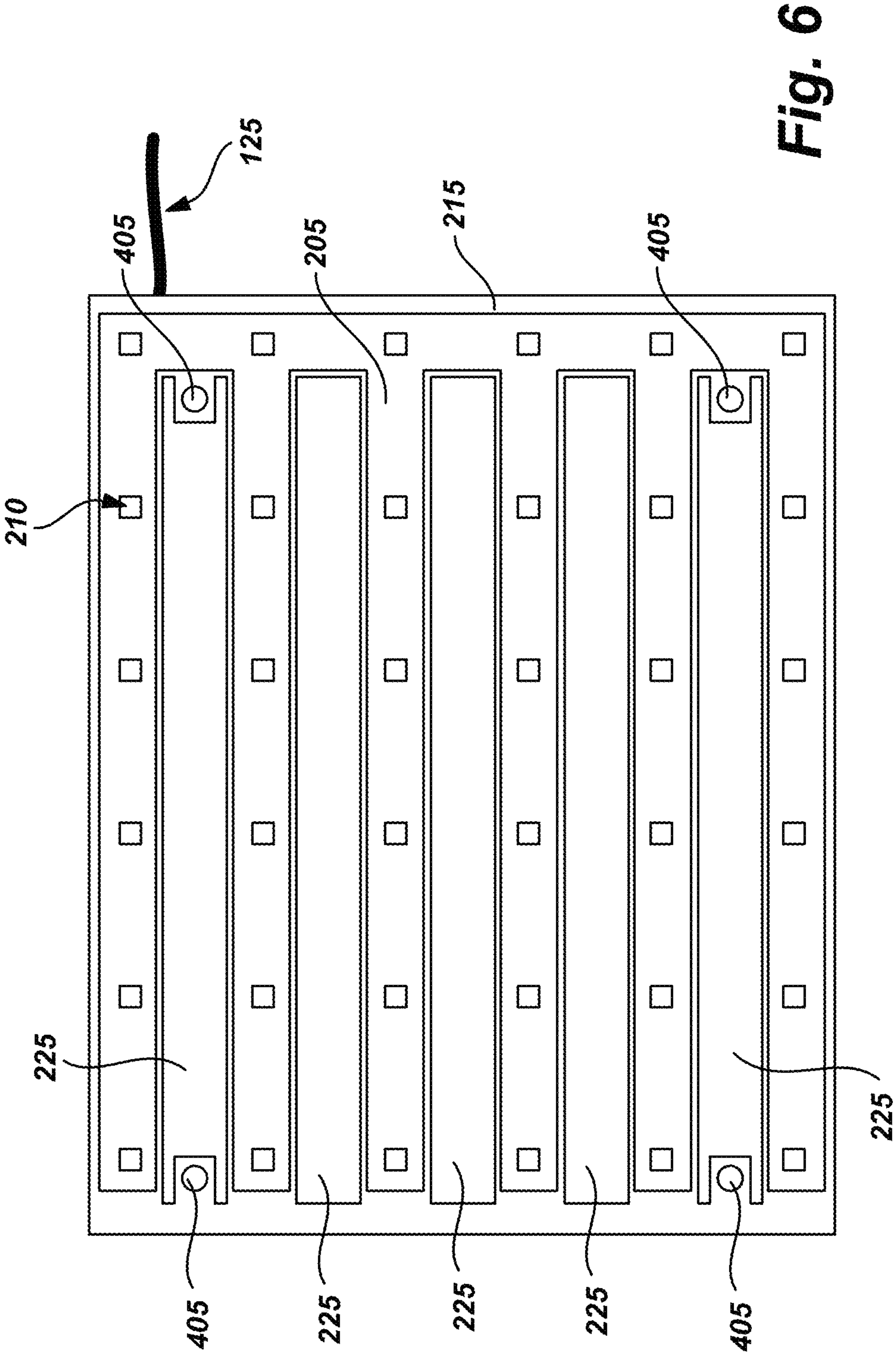
FIG. 6 is a 2-dimensional bottom view of an exemplary apparatus of the present invention.

FIG. 6 illustrates a 2-dimensional bottom view of lighting apparatus 105, which depicts one or more exemplary disclosed open spaces 225 in lighting assembly 200 for allowing sound to pass through lighting assembly 200 to sound absorbing assembly 300. As illustrated in FIG. 6, controller 205 and mounting member 215 may be configured to form one or more (e.g., a plurality of) open spaces 225. Controller 205 and mounting member 215 may be formed with apertures corresponding to open space 225. For example, controller 205 and mounting member 215 may be formed with apertures that are aligned so that one or more open spaces 225 may be formed through apertures of both controller 205 and mounting member 215 when controller 205 is attached to mounting member 215. As illustrated in FIG. 6, open spaces 225 may be formed around members 405 of attachment assemblies 400 so that members 405 may attach lighting assembly 200 to sound absorbing assembly 300 and support structure 140.

One or more open spaces 225 may allow for sound to pass through lighting assembly 200. Sound may thereby pass through lighting assembly 200, via one or more open spaces 225, to sound absorbing assembly 300 to be absorbed by one or more sound absorbing members 305. Some or substantially all sound entering backlighting space 100 from occupied space 115 may thereby pass through lighting assembly 200 and be absorbed by sound absorbing assembly 300 without being reflected off of support structure 140 and/or other components of apparatus 105 and sent back into occupied space 115 (e.g., as an echo from backlighting space 110).

One or more open spaces 225 may also serve as apertures for electrical connectors 125 to pass through for connecting controller 205 to power source 130 and driver 135. Electrical connectors 125 may thereby be disposed away from (e.g., above) an optical plane formed between lighting elements 210 and translucent layer 120 (e.g., a surface of translucent layer 120 facing backlighting space 110 and illuminated by lighting elements 210). Electrical connectors 125 may thereby be routed through one or more open spaces 225 to reduce or substantially avoid interference of electrical connectors 125 with the illuminated plane of translucent layer 120.

Figure 7A:
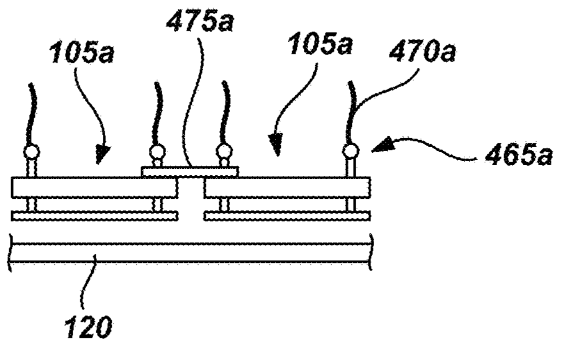
FIG. 7A is a schematic view of an exemplary embodiment of an exemplary system of the present invention.
Figure 7:
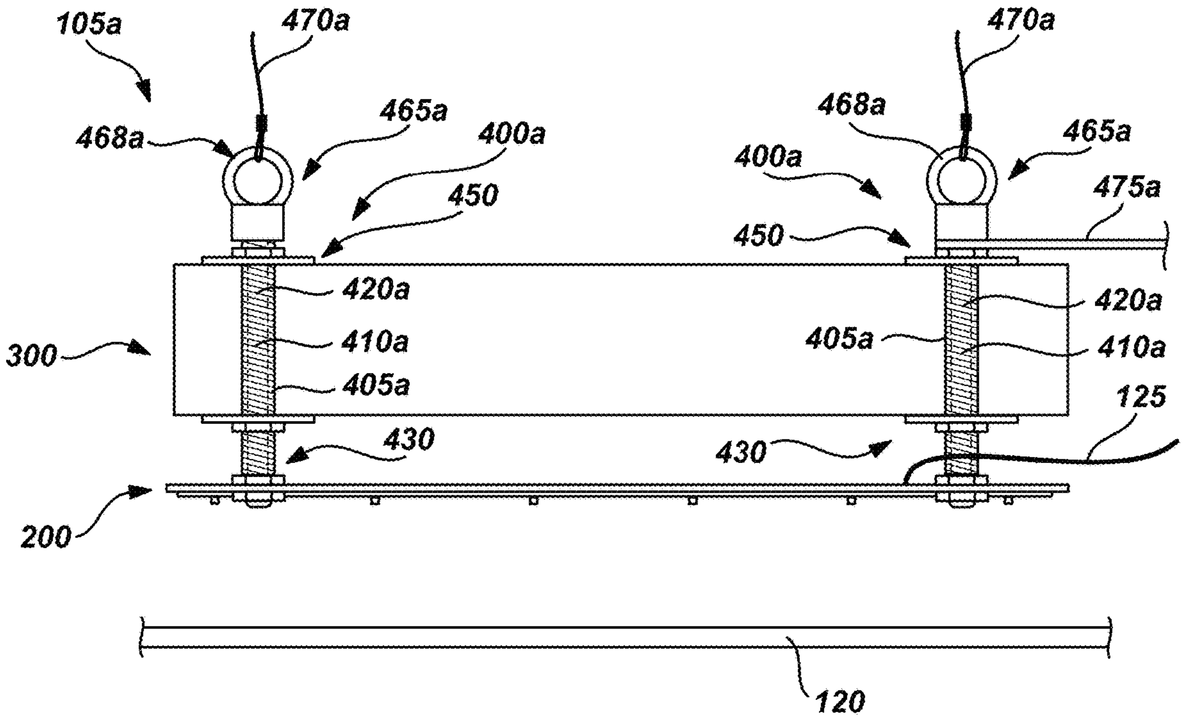
FIG. 7 is a 2-dimensional side view of another exemplary embodiment of an exemplary apparatus of the present invention for a pendant mount configuration.

FIG. 7 illustrates another exemplary embodiment of the exemplary disclosed apparatus. Apparatus 105*a* may be generally similar to apparatus 105 and may include lighting assembly 200 and sound absorbing assembly 300 for example as described above that may be attached via an attachment assembly 400*a* that may be generally similar to attachment assembly 400. Attachment assembly 400*a* may include first positioning assembly 430 and second positioning assembly 450 for example as described above. Attachment assembly 400*a* may also include a hollow or solid member 405*a* that may be generally similar to hollow or solid member 405, and a fastener 410*a* that may be generally similar to fastener 410. Member 405*a* and/or fastener 410*a* may be received by a suspended fastener 465*a*. For example, suspended fasteners 465*a* may include a threaded aperture configured to receive either threading (e.g., similar to member threading 408) on an outside surface of member 405*a* or threads 420*a* of fastener 410*a*, and/or may be attached to member 405*a* and/or fastener 410*a* via any suitable fastener or mechanical attachment technique, adhesive, and/or any other suitable attachment technique. Suspended fastener 465*a* may be attached to a suspension member 470*a* via an eyelet 468*a* and/or any other suitable mechanical attachment technique for attaching suspended fastener 465*a* to suspension member 470*a*. For example, suspended fastener 465*a* may be a suspension ring (e.g., a threaded cable suspension ring). Suspension member 470*a* may be any suitable structural member for supporting apparatus 105*a* such as, for example, a cable, a wire, a rope (e.g., wire rope or fabric rope), a rod (e.g., a threaded rod or a tension rod), and/or any other suitable structural member. In at least some exemplary embodiments, suspension member 470*a* that may be a suspension cable may be passed through eyelet 468*a* and fastened such that apparatus 105*a* may be positioned at a desired height or spacing and at a desired orientation (e.g., made level) relative to translucent layer 120. Suspension member 470*a* may also be passed through member 405*a* and knotted or provided with any other suitable terminating device so that it will not pass back through member 405*a*. Then it may be affixed to the exemplary disclosed structure as described above. This may eliminate eyelet 468*a* in at least some exemplary embodiments. One or more suspension members 470*a* may be attached to a support structure (e.g., that may be similar to support structure 140) via any suitable technique such as, for example, fasteners (e.g., anchor screws or bolts), welding, adhesive, and/or any other suitable attachment technique.

Apparatus 105*a* may thereby be suspended above translucent layer 120 for example as illustrated in FIG. 7. Apparatus 105*a* may also include a spacer member 475*a* that may include an aperture on which it may be received by member 405*a* or fastener 410*a* prior to member 405*a* and/or fastener 410*a* being attached to suspended fastener 465*a*. For example, a clearance space may be provided between second positioning assembly 450 and suspended fastener 465*a* to provide a space for spacer member 475*a* to be received between second positioning assembly 450 and suspended fastener 465*a* (e.g., or at any other suitable location of apparatus 105*a*). Spacer member 475*a* may be formed from material similar to components of attachment assembly 400 for example as described above. Spacer member 475*a* may be a bracket including multiple apertures that may be received by a first member 405*a* or fastener 410*a* as illustrated above, and similar components of an adjacent apparatus 105*a* (e.g., as illustrated in FIG. 7A). Accordingly and for example as illustrated in FIG. 7A, spacer member 475*a* may be attached between adjacent apparatuses 105*a* and may thereby provide a desired spacing between adjacent suspended apparatuses 105*a*.

Figure 8:
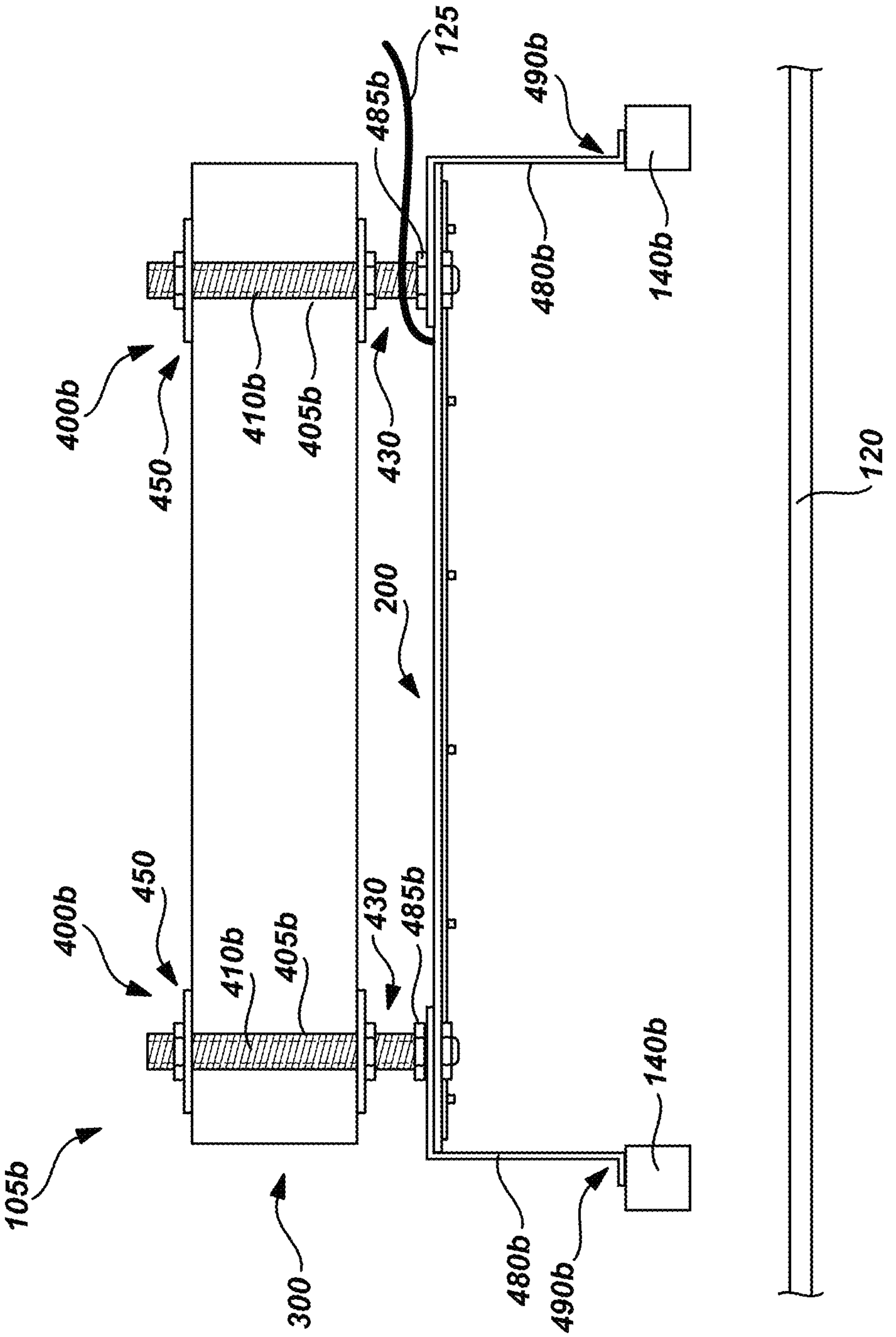
FIG. 8 is a 2-dimensional side view of another exemplary embodiment of an exemplary apparatus of the present invention.

FIG. 8 illustrates another exemplary embodiment of the exemplary disclosed apparatus. Apparatus 105*b* may be generally similar to apparatus 105 and may include lighting assembly 200 and sound absorbing assembly 300 for example as described above that may be attached via an attachment assembly 400*b* that may be generally similar to attachment assembly 400. Attachment assembly 400*b* may include first positioning assembly 430 and second positioning assembly 450 for example as described above. Attachment assembly 400*b* may also include a member 405*b* that may be generally similar to member 405, and a fastener 410*b* that may be generally similar to fastener 410. Attachment assembly 400*b* may also include one or more support legs 480*b*. Support leg 480*b* may be any suitable structural member formed for example from material similar to components of attachment assembly 400 as described above. Support leg 480*b* may be a bent structural plate. A first support end portion 485*b* of support leg 480*b* may be received by member 405*b* (e.g., or fastener 410*b*) and/or attached via first position assembly 430 to lighting assembly 200. Support leg 480*b* may thereby be attached (e.g., firmly attached) to lighting assembly 200 and/or attachment assembly 400*b*. A second support end portion 490*b* of support leg 480*b* may be supported at (e.g., supported on) and/or attached to a support structure 140*b* that may be generally similar to the exemplary disclosed support structure described above. Support structure 140*b* may be below the exemplary disclosed lighting assembly, or disposed above the exemplary disclosed lighting assembly. Apparatus 105*b* may thereby be supported from above, level to, or from below by support structure 140*b*. Varying lengths and/or shapes of support legs 480*b* may be provided so that apparatus 105*b* may be configured to be supported by a given configuration of support structure 140*b*. Lighting assembly 200 and sound absorbing assembly 300 may thereby be supported above support structure 140*b* and translucent layer 120.

The exemplary disclosed apparatus may be configured (e.g., fabricated) in any suitable size and shape to fit the contours of various ceilings and/or architectural features. For example, the exemplary disclosed apparatus may be configured to fit ceilings and/or architectural features including angles and curves. The exemplary disclosed apparatus may also be configured in various shapes and sizes to be used in any suitable type of lighting fixtures. For example, the exemplary disclosed apparatus may be included in pendant-type lighting fixtures.

The exemplary disclosed system, apparatus, and method may be used in any suitable application involving lighting. For example, the exemplary disclosed system, apparatus, and method may be used in any suitable application for backlight lighting fixtures. The exemplary disclosed system, apparatus, and method may be used in any suitable application for absorbing sound and/or thermal transfer in lighting fixtures.

Figure 9:
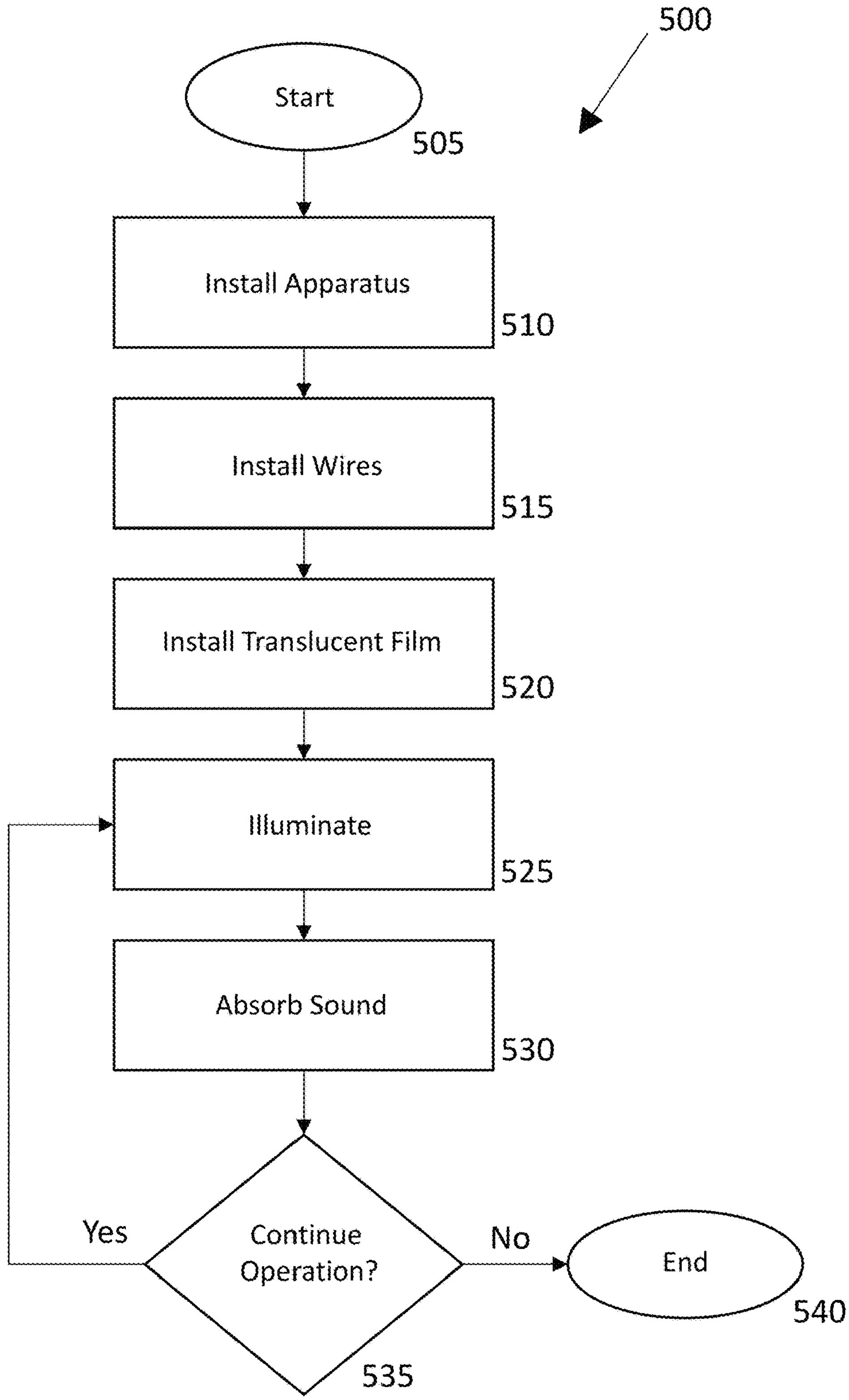
FIG. 9 illustrates an exemplary process of installing and using at least some exemplary embodiments of the present disclosure.

FIG. 9 illustrates an exemplary process of using the exemplary disclosed apparatus. Process 500 begins at step 505. At step 510, the exemplary disclosed apparatus may be installed. For example as described above regarding apparatus 105, lighting apparatus 105 may be installed by first attaching lighting assembly 200 to attachment assembly 400 as described above, then attaching sound absorbing assembly 300 to attachment assembly 400 as described above, and then receiving fastener 410 through member 405. Fastener 410 may then be attached to support structure 140 for example as described above. Lighting apparatus 105*a* may be similarly installed, including supporting lighting apparatus 105*a* via suspension members 470*a* for example as described above. Lighting apparatus 105*b* may be similarly installed, including supporting lighting apparatus 105*b* on support structure 140*b* via one or more support legs 480*b* for example as described above. As many exemplary disclosed lighting apparatuses as desired may be installed. In at least some exemplary embodiments, a complete factory assembly of exemplary disclosed LEDs, mounting plate, standoffs, sound absorbing material, and other exemplary disclosed components may be performed and then shipped as full units. Field installation may start with attaching the complete unit by any suitable mounting method.

At step 515, for example after installation of lighting apparatuses at step 510, electrical connectors 125 may be installed through open spaces 225 for example as described above. In at least some exemplary embodiments, electrical connectors 125 connected to one or more drivers 135 may be routed above mounting members 215 and to desired locations (e.g., through open spaces 225) at controllers 205 (e.g., attached to terminals on controllers 205). Electrical connectors 125 may be bundled and tied to members 405 (e.g., and/or members 405*a* and 405*b*) as desired along their path from one or more drivers 135 to one or more apparatuses. In at least some exemplary embodiments, multiple lighting apparatuses may be supported by a single driver 135.

At step 520, for example after the exemplary disclosed lighting apparatuses have been installed and electrically connected (e.g., connected via electrical connectors 125 and tested), translucent layer 120 (e.g., a translucent and sound penetrable film) may be installed below (e.g., or any other suitable location relative to) the exemplary disclosed lighting apparatuses (e.g., below or to the side of an LED PCB plane of lighting apparatus 105, or below lighting apparatuses 105*a* or 105*b*). For example, translucent layer 120 may be installed based on attachment to support structure 140, support structure 140*b*, and/or attachment to any other suitable structural feature via mechanical fasteners, adhesive, and/or any other suitable attachment technique.

At step 525, after installation steps 510 through 520 are complete, the exemplary disclosed lighting apparatuses may operate to illuminate translucent layer 120 and occupied space 115 for example as described herein. Lighting apparatuses 105, 105*a*, and/or 105*b* may operate so that light emanating from lighting elements 210 may illuminate (e.g., strike) translucent layer 120 (e.g., to uniformly illuminate translucent layer 120). Translucent layer 120 may thereby illuminate occupied space 115. Also for example, step 530 described below may precede step 525.

At step 530, which may occur before, after, or simultaneously with step 525, sound from occupied space 115 entering backlighting space 110 may be absorbed for example as described above. Sound within occupied space 115 may interact with translucent layer 120. Sound may pass through the exemplary disclosed micro-perforations of translucent layer 120 for example as described above and/or may be transmitted via vibrations of translucent layer 120. The sound may then enter backlighting space 115 and traverse the space between translucent layer 120 and the exemplary disclosed lighting assembly. The sound may pass through one or more open spaces 225 of lighting assemblies 200 for example as described above. The sound may then contact one or more sound absorbing members 305, which may absorb (e.g., capture) the sound. Some or substantially all of the sound may thereby be captured and substantially prevented from bouncing off of the exemplary support structure and/or components of the exemplary disclosed lighting apparatuses and returning to occupied space 115.

At step 535, it may be determined whether or not an operation of lighting system 100 should be continued. If operation of lighting system 100 is to be continued, process 500 may return to step 525. Steps 525 through 535 may be repeated for as many iterations as desired. Step 530 may precede step 525 as described above. If it is determined at step 535 that operation of system 100 is not to be continued, then process 500 ends at step 540.

In at least some exemplary embodiments, a preassembled lighting apparatus may be raised into place, and the exemplary disclosed fastener may be driven through one or more hollow members and into the exemplary disclosed support structure. A substantially entire ceiling area may be covered with the exemplary disclosed lighting apparatuses. Translucent layer 120 may then be used to cover the exemplary disclosed lighting apparatuses.

In at least some exemplary embodiments, lighting system 100 may provide one or more lighting apparatuses to both illuminate an area and absorb sound waves that intersect it, thereby reducing unwanted noise in the proximity of the one or more lighting apparatuses. Lighting system 100 may provide a backlight that uniformly illuminates (e.g., from behind the translucent material) translucent material covering a ceiling or other surfaces. Lighting system 100 may include one or more lighting apparatuses that secure an acoustic absorbent material, the acoustic absorbent material being separated from lighting elements of the one or more lighting elements.

Lighting system 100 may provide for isolation of lighting assembly 200 from sound absorbing assembly 300, which in addition to increasing sound absorbing performance may also provide increased thermal transmittance (e.g., increasing a dissipation of heat generated by lighting elements 210 of lighting assembly 200). This characteristic of lighting system 100 may allow for higher efficiency of lighting assembly 200 and an ability to operate lighting elements 210 at higher output levels, thereby providing increased light to illuminate occupied space 115 at a relatively lower cost and use of energy.

In at least some exemplary embodiments, lighting system 100 may provide for lighting assembly 200 and sound absorbing assembly 300 to be relatively easily mounted by screwing the exemplary disclosed lighting apparatuses directly to a support structure (e.g., a surface), suspending it from suspension members, or supporting lighting apparatuses from below. Also, based on isolation of sound absorbing assembly 300 from lighting assembly 200 based on providing empty space 145 (e.g., and/or second empty space 150), lighting system 100 may allow for electrical connectors (e.g., electrical connectors 125) to be installed after the exemplary disclosed lighting apparatuses are mounted, without electrical connectors interfering with an optical cavity (e.g., between lighting elements 210 and translucent layer 120 for example as described above). Accordingly, installing and operating lighting system 100 may not involve passing wires through sound-absorbing material and/or surface mounting material, which may be difficult, expensive, and time-consuming. Accordingly, lighting system 100 may involve simplified installation and/or service.

In at least some exemplary embodiments, lighting system 100 may provide for relatively easily linking multiple lighting assemblies together in a suspended mounting arrangement that may provide substantially uniform light distribution. Further, lighting system 100 may allow for drivers 135 to be mounted with lighting assemblies 200 or mounted remotely. Additionally, lighting system 100 may allow for lighting elements 210 to provide static white light, tunable white light, and/or RGB or RGBW mixable light. Also, lighting system 100 may allow for lighting apparatuses to be relatively easily customized in shape and/or height.

In at least some exemplary embodiments, the exemplary disclosed lighting elements and acoustic panels of lighting system 100 may be sized according to any desired shape (e.g., cut to different shapes). Also for example, the exemplary disclosed lighting apparatuses may be spaced so that they are touching to provide a continuous layer of sound absorbing material and even illumination of the exemplary disclosed translucent material.

In at least some exemplary embodiments, the exemplary disclosed method may include providing a lighting assembly (e.g., lighting assembly 200) including at least one lighting element, attaching at least one attachment assembly (e.g., attachment assembly 400, attachment assembly 400*a*, or attachment assembly 400*b*) to the lighting assembly, forming an empty space between the lighting assembly and a sound absorbing assembly (e.g., sound absorbing assembly 300) based on attaching the sound absorbing assembly to the at least one attachment assembly, the sound absorbing assembly including at least one sound absorbing member, and illuminating a translucent or transparent layer using the at least one lighting element. The exemplary disclosed method may also include receiving sound through the translucent or transparent layer and at least one open space formed in the lighting assembly, and absorbing the sound with the at least one sound absorbing member. Attaching the at least one attachment assembly to the lighting assembly and the sound absorbing assembly may include attaching at least one member of the at least one attachment assembly to the lighting assembly and the sound absorbing assembly. The exemplary disclosed method may further include attaching the at least one attachment assembly to a support structure based on inserting a fastener through the at least one member and attaching the fastener to the support structure. Attaching the at least one attachment assembly to the support structure may include transferring tightening forces from the fastener to the at least one member without transferring the tightening forces to the lighting assembly or the sound absorbing assembly. Forming the empty space between the lighting assembly and the sound absorbing assembly may include tightening attaching nuts received on the at least one member against the lighting assembly, and threading a positioning nut on the at least one member against a positioning washer on which the at least one sound absorbing member rests. The exemplary disclosed method may also include providing a second empty space between the sound absorbing assembly and the support structure, wherein the sound absorbing assembly may be disposed between the support structure and the lighting assembly, and separates the empty space from the second empty space. Attaching the at least one attachment assembly to the sound absorbing assembly may include inserting at least one member of the at least one attachment assembly through an aperture of the at least one sound absorbing member. The exemplary disclosed method may further include suspending the at least one attachment assembly above the translucent or transparent layer from at least one suspension member. The exemplary disclosed method may also include supporting the lighting assembly with a support structure disposed above the translucent or transparent layer. The exemplary disclosed method may further include electrically connecting the lighting assembly with a driver via an electrical connector that passes through an open space formed by a printed circuit board and a mounting member of the lighting assembly that may be attached together. The exemplary disclosed method may also include transferring heat away from the at least one lighting element that may be at least one LED, wherein the at least one LED provides at least one of static white light, tunable white light, or RGB or RGBW mixable light.

In at least some exemplary embodiments, the exemplary disclosed lighting apparatus may be a lighting apparatus for illuminating a translucent or transparent layer. The exemplary disclosed lighting apparatus may include a lighting assembly (e.g., lighting assembly 200) including at least one lighting element configured to illuminate the translucent or transparent layer, a sound absorbing assembly (e.g., sound absorbing assembly 300) including at least one sound absorbing member, and at least one attachment assembly (e.g., attachment assembly 400, attachment assembly 400*a*, or attachment assembly 400*b*) attached to the lighting assembly and the sound absorbing assembly so that an empty space is formed between the lighting assembly and the sound absorbing assembly. The at least one attachment assembly may include at least one member, the at least one member configured to be fastened to the lighting assembly and to the sound absorbing assembly. The at least one attachment assembly may include a member and a fastener, the fastener configured to be received by the member and fastened to a support structure. The lighting assembly may include a mounting member and a controller attached to the mounting member, the mounting member and the controller forming at least one open space when attached.

In at least some exemplary embodiments, the exemplary disclosed method may include providing a plurality of lighting apparatuses, each of the plurality of lighting apparatuses including at least one attachment assembly (e.g., attachment assembly 400, attachment assembly 400*a*, or attachment assembly 400*b*) attached to a lighting assembly (e.g., lighting assembly 200) and a sound absorbing assembly (e.g., sound absorbing assembly 300) so that an empty space may be formed between the lighting assembly and the sound absorbing assembly of each of the plurality of lighting apparatuses, illuminating a translucent or transparent layer using the lighting assemblies of the plurality of lighting apparatuses, the lighting assemblies each including at least one open space, receiving sound through the translucent or transparent layer and the at least one open spaces formed in the lighting assemblies of the plurality of lighting apparatuses, and absorbing the sound with the sound absorbing assemblies of the plurality of lighting apparatuses. The exemplary disclosed method may also include spacing at least some of the plurality of lighting apparatuses from each other based on attaching a spacing member between the at least one attachment assemblies of adjacent lighting apparatuses of the plurality of lighting apparatuses. The exemplary disclosed method may further include electrically connecting the lighting assemblies of the plurality of lighting apparatuses with a driver via at least one electrical connector that passes through the at least one open spaces formed in the lighting assemblies of the plurality of lighting apparatuses. The translucent or transparent layer may be a ceiling film and the empty spaces of the plurality of lighting apparatuses are horizontally aligned.

In at least some exemplary embodiments, the exemplary disclosed system, apparatus, and method may provide an efficient and effective system for absorbing sound in lighting apparatuses (e.g., lighting fixtures). For example, the exemplary disclosed system, apparatus, and method may provide for efficient dissipation of heat generated by a lighting fixture, which may allow for higher efficiency of the lighting fixture and the ability to provide increased illumination at a relatively lower cost. The exemplary disclosed system, apparatus, and method may also provide a lighting fixture that may be quickly and easily installed.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. A method, comprising:

providing a lighting assembly including at least one lighting element;

attaching at least one attachment assembly to the lighting assembly;

forming an empty space between the lighting assembly and a sound absorbing assembly based on attaching the sound absorbing assembly to the at least one attachment assembly, the sound absorbing assembly including at least one sound absorbing member; and illuminating a translucent or transparent layer using the at least one lighting element;

wherein attaching the at least one attachment assembly to the lighting assembly and the sound absorbing assembly includes attaching at least one member of the at least one attachment assembly to the lighting assembly and the sound absorbing assembly; and wherein the at least one member of the at least one attachment assembly is hollow.

2. The method of claim 1, further comprising receiving sound through the translucent or transparent layer and at least one open space formed in the lighting assembly, and absorbing the sound with the at least one sound absorbing member.

3. The method of claim 1, further comprising attaching the at least one attachment assembly to a support structure based on inserting a fastener through the at least one member and attaching the fastener to the support structure.

4. The method of claim 3, wherein attaching the at least one attachment assembly to the support structure includes transferring tightening forces from the fastener to the at least one member without transferring the tightening forces to the lighting assembly or the sound absorbing assembly.

5. The method of claim 3, further comprising providing a second empty space between the sound absorbing assembly and the support structure, wherein the sound absorbing assembly is disposed between the support structure and the lighting assembly, and separates the empty space from the second empty space.

6. The method of claim 1, wherein forming the empty space between the lighting assembly and the sound absorbing assembly includes tightening attaching nuts received on the at least one member against the lighting assembly, and threading a positioning nut on the at least one member against a positioning washer on which the at least one sound absorbing member rests.

7. The method of claim 1, wherein attaching the at least one attachment assembly to the sound absorbing assembly includes inserting at least one member of the at least one attachment assembly through an aperture of the at least one sound absorbing member.

8. The method of claim 1, further comprising suspending the at least one attachment assembly above the translucent or transparent layer from at least one suspension member.

9. The method of claim 1, further comprising supporting the lighting assembly with a support structure disposed above the translucent or transparent layer.

10. The method of claim 1, further comprising electrically connecting the lighting assembly with a driver via an electrical connector that passes through an open space formed by a printed circuit board and a mounting member of the lighting assembly that are attached together.

11. The method of claim 1, further comprising transferring heat away from the at least one lighting element that is at least one LED, wherein the at least one LED provides at least one of static white light, tunable white light, or RGB or RGBW mixable light.

12. A lighting apparatus for illuminating a translucent or transparent layer, comprising:

a lighting assembly including at least one lighting element configured to illuminate the translucent or transparent layer;

a sound absorbing assembly including at least one sound absorbing member; and at least one attachment assembly attached to the lighting assembly and the sound absorbing assembly so that an empty space is formed between the lighting assembly and the sound absorbing assembly; and wherein the at least one attachment assembly includes at least one member configured to attach the at least one attachment assembly to the lighting assembly and the sound absorbing assembly; and wherein the at least one member is hollow and configured to receive a fastener.

13. The lighting apparatus of claim 12, wherein the lighting assembly is a surface mount lighting fixture or a pendant lighting fixture.

14. A method, comprising:

providing a lighting assembly including at least one lighting element;

attaching at least one attachment assembly to the lighting assembly;

forming an empty space between the lighting assembly and a sound absorbing assembly based on attaching the sound absorbing assembly to the at least one attachment assembly, the sound absorbing assembly including at least one sound absorbing member;

illuminating a translucent or transparent layer using the at least one lighting element;

wherein attaching the at least one attachment assembly to the lighting assembly and the sound absorbing assembly includes attaching at least one member of the at least one attachment assembly to the lighting assembly and the sound absorbing assembly; and attaching the at least one attachment assembly to a support structure based on inserting a fastener through the at least one member and attaching the fastener to the support structure.

15. The method of claim 14, further comprising receiving sound through the translucent or transparent layer and at least one open space formed in the lighting assembly, and absorbing the sound with the at least one sound absorbing member.

16. The method of claim 14, wherein attaching the at least one attachment assembly to the support structure includes transferring tightening forces from the fastener to the at least one member without transferring the tightening forces to the lighting assembly or the sound absorbing assembly.

17. The method of claim 14, wherein forming the empty space between the lighting assembly and the sound absorbing assembly includes tightening attaching nuts received on the at least one member against the lighting assembly, and threading a positioning nut on the at least one member against a positioning washer on which the at least one sound absorbing member rests.

18. The method of claim 14, further comprising providing a second empty space between the sound absorbing assembly and the support structure, wherein the sound absorbing assembly is disposed between the support structure and the lighting assembly, and separates the empty space from the second empty space.

19. The method of claim 14, wherein attaching the at least one attachment assembly to the sound absorbing assembly includes inserting at least one member of the at least one attachment assembly through an aperture of the at least one sound absorbing member.

20. A method, comprising:

providing a lighting assembly including at least one lighting element;

attaching at least one attachment assembly to the lighting assembly;

forming an empty space between the lighting assembly and a sound absorbing assembly based on attaching the sound absorbing assembly to the at least one attachment assembly, the sound absorbing assembly including at least one sound absorbing member; and illuminating a translucent or transparent layer using the at least one lighting element;

wherein attaching the at least one attachment assembly to the lighting assembly and the sound absorbing assembly includes attaching at least one member of the at least one attachment assembly to the lighting assembly and the sound absorbing assembly; and wherein forming the empty space between the lighting assembly and the sound absorbing assembly includes tightening attaching nuts received on the at least one member against the lighting assembly, and threading a positioning nut on the at least one member against a positioning washer on which the at least one sound absorbing member rests.

* * * * *